(12) United States Patent
Nagamine et al.

(10) Patent No.: US 6,231,979 B1
(45) Date of Patent: May 15, 2001

(54) SELF-FUSIBLE INSULATED WIRE

(75) Inventors: Seiichi Nagamine; Shigeo Nishita; Takeshi Ukawa; Kazushige Tamura, all of Otsu (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/101,773

(22) PCT Filed: Oct. 23, 1997

(86) PCT No.: PCT/JP97/03865

§ 371 Date: Jul. 21, 1998

§ 102(e) Date: Jul. 21, 1998

(87) PCT Pub. No.: WO98/22955

PCT Pub. Date: May 28, 1998

(30) Foreign Application Priority Data

Nov. 22, 1996 (JP) .................................. 8-311962
Dec. 3, 1996 (JP) .................................. 8-322688

(51) Int. Cl.[7] .................................. B32B 15/00
(52) U.S. Cl. .................. 428/379; 428/375; 428/383; 174/110 N; 174/110 SR
(58) Field of Search .................. 428/375, 378, 428/379, 380, 383, 906; 174/110 SR, 110 N

(56) References Cited

U.S. PATENT DOCUMENTS

| | | | |
|---|---|---|---|
| 4,163,826 | * | 8/1979 | Kawaguchi et al. ............... 428/371 |
| 4,420,536 | * | 12/1983 | Saunders et al. .................. 428/383 |
| 5,202,187 | * | 4/1993 | Ghorashi et al. ................. 428/379 |
| 5,296,556 | * | 3/1994 | Frihart ........................... 525/420.5 |

FOREIGN PATENT DOCUMENTS

| | | |
|---|---|---|
| 50-158886 | 12/1975 | (JP) . |
| 6-32877 | 2/1994 | (JP) . |
| 8-249936 * | 9/1996 | (JP) . |

\* cited by examiner

Primary Examiner—William Krynski
Assistant Examiner—J. M. Gray
(74) Attorney, Agent, or Firm—Armstrong, Westerman, Hattori, McLeland & Naughton LLP

(57) ABSTRACT

A self-bonding insulated wire has a bonding outermost layer formed from a resin composition prepared by adding at least two, but less than 10 parts by weight of a high-melting nylon resin having a melting point of 200° C. to 300° C., such as nylon 66 or 46, to 100 parts by weight of a copolyamide resin having a melting point of 105° C. to 150° C. The polyamide resin contains a lower molar ratio of terminal carboxyl groups than terminal amino groups.

4 Claims, 3 Drawing Sheets

(a)

End of wire at which its winding was started

End of wire at which its winding was finished (b)

End of wire at which its winding was started

Tension gauge  Pull

SELF-FUSIBLE INSULATED WIRE

BACKGROUND OF THE INVENTION

1. Field of the Invention

This invention relates to an insulated wire used in the manufacture of a coil, such as a deflection yoke for a television, or computer display unit, and more particularly, to a self-bonding insulated wire having a self-bonding layer as its outermost layer.

2. Description of the Related Art

A self-bonding insulated wire has a bonding outermost layer formed on a conductor, or on an insulating layer on the conductor. A self-supporting coil can easily be formed from it if, after coiling, its bonding outermost layer is melted or swollen by e.g. electrical heating, hot air blowing, or solvent treatment to fuse every two adjoining turns of the wire together. Therefore, this kind of insulated wire does not require any step of impregnation with an insulating varnish, or the like, but makes it possible to realize an improved productivity in the manufacture of a coil for an electric apparatus and a reduction of its cost, and has come to be widely used as a magnet wire for a domestic electric appliance, OA apparatus, or other electric equipment. The self-bonding insulated wire typically comprises a conductor, an insulating layer formed thereon by repeating a plurality of times the application and baking of an insulating varnish, such as a polyurethane, or polyesterimide varnish, and a bonding outermost layer formed thereon by applying and baking a bonding varnish. It has been usual to employ, for example, an epoxy resin varnish, or a copolyamide resin varnish as the bonding varnish. A self-bonding insulated wire made by using a polyamide resin varnish as the bonding varnish is particularly widely used owing to a good bonding strength exhibited by a coil formed from it by winding, bonding and press molding.

There is a demand for a self-bonding insulated wire having a high resistance to heat deformation even at a high temperature to make a small, heat-resistant high-voltage and high-frequency coil having an improved space factor for an electric apparatus. A deflection yoke for a television, or computer display unit, among others, requires as a high-definition and high-frequency part thereof a coil which can resist heat (at a temperature of at least 105° C. at present, but at least 120° C. in the future) without making any change in dimensions, or a coil which hardly makes any change in dimensions as formed, but is close in dimensions to a winding die. Thus, there is a strong demand for a self-bonding insulated wire which has high levels of heat deformation resistance and bonding strength at a high temperature, and can form a coil which is substantially free from any deformation.

A conventional self-bonding insulated wire having a bonding layer formed from an epoxy resin varnish can make a coil which is hardly deformed, but is close in dimensions to a winding die. This coil has, however, an undesirably low level of bonding strength and a heat deformation temperature which is as low as 90° C.

A conventional self-bonding insulated wire having a bonding layer formed from a copolyamide resin varnish can make a coil having a good bonding strength and a heat deformation temperature which is as high as 120° C. Upon cooling to room temperature, however, the coil is deformed and becomes larger than the size defined by the winding die, and its deformation causes it to be distorted. If such a coil is used as a part of a deflection yoke in a high-definition display unit, or the like, it is likely to return from its distorted form and thereby cause misconvergence to occur on the screen.

A conventional self-bonding insulated wire made by applying and baking a polyamide resin varnish on an insulated wire calls for a considerably strictly controlled baking job, since its properties are greatly dependent on the baking conditions, and the resin forming its bonding layer is easily decomposed if its baking temperature is higher than usual. A coil formed from a self-bonding insulated wire having a partly decomposed resin layer is heavily deformed by springback immediately after its formation, as compared with a normal one. A deformed deflection coil is difficult to incorporate in e.g. a television, or computer display unit. Moreover, the deformation of the coil by the heat resulting from the use of e.g. a display unit causes misconvergence to occur on the screen.

The use of a self-bonding resin having a higher level of heat resistance (or a higher softening temperature) has been proposed to overcome the problems as pointed out above, but the higher heat resistance requires a higher bonding temperature for satisfactory bonding, and thereby brings about an increase of energy consumption and the heat deterioration of the insulating layer. Japanese Patent Application Laid-Open No. Hei 7-182929, for example, discloses a bonding varnish comprising 100 parts by weight of a copolyamide resin, and 5 to 50 parts by weight of nylon 12 having a specific relative viscosity. The presence of at least 5 parts by weight of nylon 12, however, has an adverse effect on the copolyamide resin, and is particularly undesirable as it brings about a lower bonding strength. It has also been found that a coil formed from a self-bonding insulated wire having a bonding layer composed of the proposed varnish is inferior in dimensional accuracy (or closeness in dimensions to the winding die used) and distorting resistance to a coil of a wire having a bonding layer of an epoxy resin.

SUMMARY OF THE INVENTION

Under these circumstances, it is an object of this invention to provide a self-bonding insulated wire which can be formed by winding, bonding and press molding into a coil close in dimensions to a die used for its winding, and having a high resistance to heat deformation at an elevated temperature, and a high bonding strength.

It is another object of this invention to provide a self-bonding insulated wire having a bonding layer formed by applying and baking a varnish consisting mainly of a polyamide resin without causing the polyamide resin to be decomposed, so that a coil formed from the wire may not undergo any heat deformation when exposed to a high temperature.

These objects are attained by a self-bonding insulated wire having a bonding outermost layer formed from a resin composition comprising 100 parts by weight of a copolyamide resin having a melting point of 105° C. to 150° C., or a mixture of two or more such resins, and at least two, but less than 10 parts by weight of a high-melting nylon resin having a melting point of 200° C. to 300° C. The self-bonding insulated wire of this invention has a high bonding strength and a high resistance to heat deformation owing to the copolyamide resin forming its bonding layer, and can be formed into a coil not appreciably deformed, but close in dimensions to a die used for its winding, as a wire having a bonding layer of an epoxy resin can. The melting points of the polyamide and nylon resins are as determined by DSC (differential scanning calorimetry).

The copolyamide resin is obtained by the copolymerization of two or more kinds of nylon homopolymers. The copolyamide resin used for the purpose of this invention has a melting point of 105° C. to 150° C. The lower limit of 105° C. is essential, since this kind of wire is already required to have a sufficiently high level of heat resistance to withstand a temperature of at least 105° C., and the upper limit of 150° C. is essential, since the wire has its insulating layer deteriorated by heat if it is heated at a temperature over 150° C. for melting the resin. Specific examples of the commercially available copolyamide resins are X7079, T-170, T-250, T-350, T-430, T-450, T-470 and T-550 of Daicel-Hüls Ltd., and H-005, H-104, H-105, H-106, M-1186, M-1259, M-1422 and M-1425 of Nippon Rilsan Co., Ltd.

One of these, or an appropriate combination thereof may be employed.

Nylon 66 and nylon 46 are specific examples of the high-melting nylon resins having a melting point of 200° C. to 300° C. Nylon 6 is another high-melting nylon resin, but nylon 66 or 46 is preferred, since nylon 6 is less suitable for a wire for a coil which is not deformed.

The high-melting nylon resin having a melting point of 200° C. to 300° C. is used in the amount of at least two, but less than 10 parts by weight with 100 parts by weight of the copolyamide resin so as not to exert any adverse effect on the copolyamide resin. The addition of the high-melting resin in the amount of 10 parts by weight, or more seriously lowers the bonding property of the copolyamide resin, and in this connection, the preferred amount of the high-melting resin is not more than five parts by weight. It is a resin having a melting point of at least 200° C. that is effective when its amount is limited as stated above. On the other hand, a resin having a melting point over 300° C. is too poorly soluble in an organic solvent for easy and efficient preparation of any varnish.

The copolyamide resin is preferably of the type that its terminal carboxyl groups have a lower molar ratio than its terminal amino groups, so that no decomposition of the polyamide resin may occur during the formation of the bonding layer, and so that a coil formed from the wire may not be deformed when exposed to a high temperature. The preferred molar ratio of its terminal carboxyl:amino groups is from 20:80 to 0:100. The polyamide resin which has hitherto been used as a molding material is of the type that its terminal carboxyl groups have a higher molar ratio than its terminal amino groups, so that the resin may not easily be colored, while it is easy to manufacture. This type of resin is, however, easily decomposed at a high temperature, and if it is used to form a bonding layer on a self-bonding insulated wire, it is easily decomposed when it is baked. Coloring does not present any problem to a resin used to form a bonding layer on a self-bonding insulated wire, as opposed to a resin used as a molding material. If a polyamide resin containing a lower molar ratio of terminal carboxyl groups than terminal amino groups is used for a varnish for forming a bonding layer, the layer is easier to form, since a higher temperature can be employed for baking the resin without decomposing it, whereby an improved productivity can be achieved. A wire having such a bonding layer can make a coil having a good resistance to heat deformation at a high temperature. No such result can be obtained if the polyamide resin contains a higher molar ratio of terminal carboxyl groups than terminal amino groups. The terminal carboxyl groups in the polyamide resin preferably have a molar ratio of 20% or less relative to the total of the terminal carboxyl and amino groups. The polyamide resin containing a lower molar ratio of terminal carboxyl groups than terminal amino groups exhibits a high heat resistance for some reason that is not clear, but probably because the lower ratio of the terminal carboxyl groups makes less likely the decomposition of the resin by acid at room or elevated temperature.

The polyamide resin is a product formed by, for example, the polymerization of lactams, or the polymerization of dibasic acid and diamine. A combination of two or more such resins can be used as a copolyamide resin.

Examples of the polyamide resins are a copolyamide resin composed of aliphatic polyamide homopolymers, or monomer units, a copolyamide resin composed of aliphatic and alicyclic polyamide monomer units, and a copolyamide resin comprising aromatic polyamide homopolymers, or monomer units. Specific examples of the aliphatic polyamides are Daiamid 450 and Daiamid 470 of Daicel-Hüls Ltd., and M-1186 and H-105 of NIHON RILSAN K.K. H-104, M-1422 and M-1425 of NIHON RILSAN K.K. are examples of the copolyamide resins formed from the aliphatic and alicyclic polyamide monomer units. T-3000 and T-5000 of Daicel-Hüls Ltd. are examples of the copolyamide resins comprising aromatic polyamide monomer units. While these examples are not intended for limiting the polyamide resin used in making a self-bonding insulated wire according to this invention, it is advisable to select an adequate one for the purpose for which the wire, or a coil thereof will be used. A 0.5% m-cresol solution of the polyamide resin preferably has a relative viscosity of 1.4 to 2.0 at 25° C. A polyamide resin having a relative viscosity of less than 1.4 has too low a molecular weight to produce any improved result in preventing any such deformation at room or elevated temperature as mentioned above. A polyamide resin having a relative viscosity exceeding 2.0 is suitable for use in achieving an improved resistance to heat deformation, but has so high a molecular weight that a varnish prepared from it is too viscous to be easily and efficiently applicable onto a conductor.

The varnish used for forming the bonding layer of the self-bonding insulated wire according to this invention is prepared by dissolving the polyamide resin in an organic solvent. Any organic solvent can be used if it is a good solvent for the polyamide resin. It is, however, preferable to use a solvent having a phenolic hydroxyl group or groups, such as phenol, o-cresol, m-cresol, p-cresol, 2,3-xylenol, 2,4-xylenol, 2,5-xylenol, 2,6-xylenol, 3,4-xylenol, 3,5-xylenol, o-n-propylphenol, 2,4,6-trimethylphenol, 2,3,5-trimethylphenol, 2,4,5-trimethylphenol, 4-ethyl-2-methylphenol or 5-ethyl-2-methylphenol, or cresylic acid as a mixture thereof. As a diluent, it is possible to use, for example, any of aliphatic or aromatic hydrocarbons, ethers, acetals, ketones and esters. Examples of the aliphatic and aromatic hydrocarbons are n-heptane, n-octane, cyclohexane, decalin, dipentene, pinene, dodecane, tetradecane, benzene, toluene, xylene, ethylbenzene, diethylbenzene, isopropylbenzene, acylbenzene, p-cymene and tetralin, and mixtures thereof, and petroleum, coal tar or solvent naphtha.

The varnish may be of any concentration if it is properly applicable onto a conductor, but the use of a varnish having a lower concentration is preferred for a conductor having a smaller thickness so that it may not be broken during the application of the varnish.

The varnish may further contain an appropriate lubricant to impart lubricating property to the wire surface. The lubricant can be selected from among, for example, polyolefins such as low-density, high-density and medium-density polyethylenes, polypropylene, polybutylene, polymethylpentene and an ethylene-propylene copolymer; fluororesins such as polytetrafluoroethylene, a tetrafluoroethylene-hexafluoropropylene copolymer, a tetrafluoroethylene ethylene copolymer and polyvinylidene fluoride; and waxes such as solid paraffin, microcrystalline wax, carnauba wax, bees wax, montan wax, ozokerite, ceresin, Japan wax, candelilla wax, shellac wax, spermaceti and enolin, and mixtures thereof.

The self-bonding insulated wire has its bonding outermost layer formed by applying and baking the above varnish on the conductor directly, or after forming an insulating layer thereon. The varnish is applied continuously by e.g. die squeezing, and baked in a heating enameling oven having a temperature of 250° C. to 500° C. to form a bonding layer having a thickness of 0.005 to 0.015 mm.

A coil which can be formed from the self-bonding insulated wire of this invention is free from any defective bending causing its loosening, can be left to stand at room temperature without becoming undesirably distorted, or deformed from its dimensions and shape as defined by the die used for its winding, and also has a high resistance to heat deformation at an elevated temperature. The coil is, therefore, particularly useful as, say, a deflection yoke for a television, since it is easy to incorporate in the television, and is not so affected by heat to cause any misconvergence on its screen.

BEST MODE OF CARRYING OUT THE INVENTION

Figure 1:
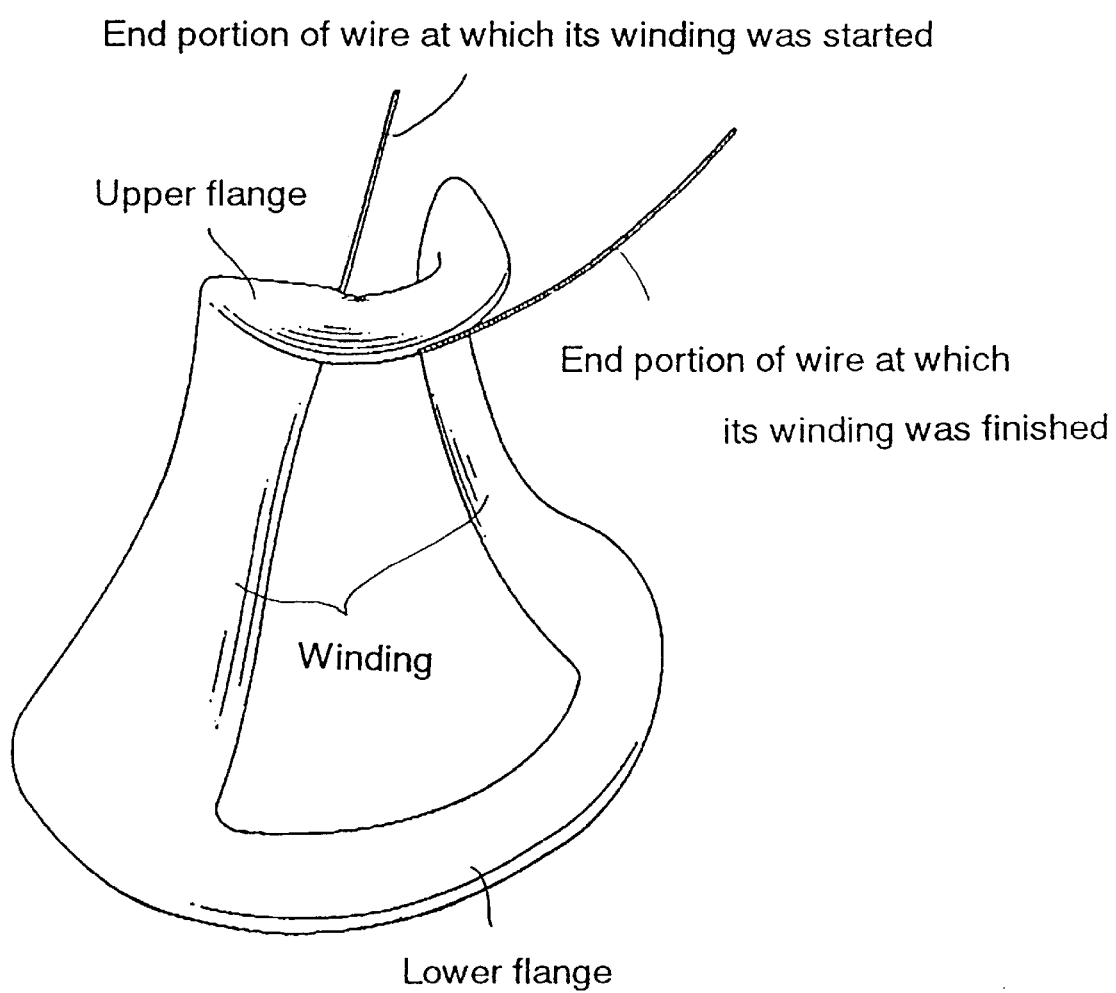
FIG. 1 is a schematic perspective view of a coil formed from a self-bonding insulated wire by winding, bonding and press molding.

The invention will now be described more specifically by way of examples embodying it, as well as comparative examples representing the prior art. It is, however, to be understood that these examples are merely illustrative, and are not intended for limiting the scope of this invention. In the following description, "%" and "parts" are on a weight basis unless otherwise noted.

EXAMPLE 1

A bonding varnish having a resin content of 18% was prepared by dissolving 100 parts of X7079 of Daicel-Hüls Ltd. having a melting point of 130° C. as a copolyamide resin and 5 parts of A-100 of Unitica, which was nylon 66 having a melting point of 260° C., as a high-melting nylon resin, in a mixed solvent consisting of cresol and xylene in a weight ratio of 70:30. The varnish was applied onto an insulated polyesterimide wire having a conductor diameter of 0.250 mm and a final outside diameter of 0.290 mm, and baked in an enameling oven having a length of 3 m and a temperature of 300° C., while the wire was fed therethrough at a speed of 36 m/min. Its application and baking were repeated three times to form a bonding layer having a thickness of 0.010 mm on the wire, and thereby make a self-bonding insulated wire embodying this invention.

EXAMPLE 2

A self-bonding insulated wire embodying this invention was made by employing 2 parts of nylon 66, and otherwise repeating Example 1.

EXAMPLE 3

A self-bonding insulated wire embodying this invention was made by employing 9 parts of nylon 66, and otherwise repeating Example 1.

EXAMPLE 4

A self-bonding insulated wire embodying this invention was made by employing 5 parts of F5000 of Unitica, which was nylon 46 having a melting point of 290° C., as the high-melting nylon resin, and otherwise repeating Example 1.

EXAMPLE 5

A self-bonding insulated wire embodying this invention was made by employing 5 parts of A1030JR of Unitica, which was nylon 6 having a melting point of 210° C., as the high-melting nylon resin, and otherwise repeating Example 1.

COMPARATIVE EXAMPLE 1

A bonding varnish having a resin content of 18% was prepared by dissolving X7079 of Daicel-Hüls Ltd. having a melting point of 130° C. as the copolyamide resin in a mixed solvent consisting of cresol and xylene in a weight ratio of 70:30. A self-bonding insulated wire representing the prior art was made by employing the varnish and otherwise repeating Example 1.

COMPARATIVE EXAMPLE 2

A self-bonding insulated wire representing the prior art was made by employing 15 parts of A-100 of Unitica as the high-melting nylon resin, and otherwise repeating Example 1.

COMPARATIVE EXAMPLE 3

A self-bonding insulated wire representing the prior art was made by employing PKHH, an epoxy resin of Union Carbide, instead of the copolyamide resin, and otherwise repeating Comparative Example 1.

COMPARATIVE EXAMPLE 4

A self-bonding insulated wire representing the prior art was made by employing 5 parts of L1500 of Daicel-Hüls Ltd., nylon 12 having a melting point of 180° C., as the high-melting nylon resin, and otherwise repeating Example 1.

COMPARATIVE EXAMPLE 5

A self-bonding insulated wire representing the prior art was made by employing 20 parts of nylon 12, and otherwise repeating Comparative Example 4.

Figure 2:
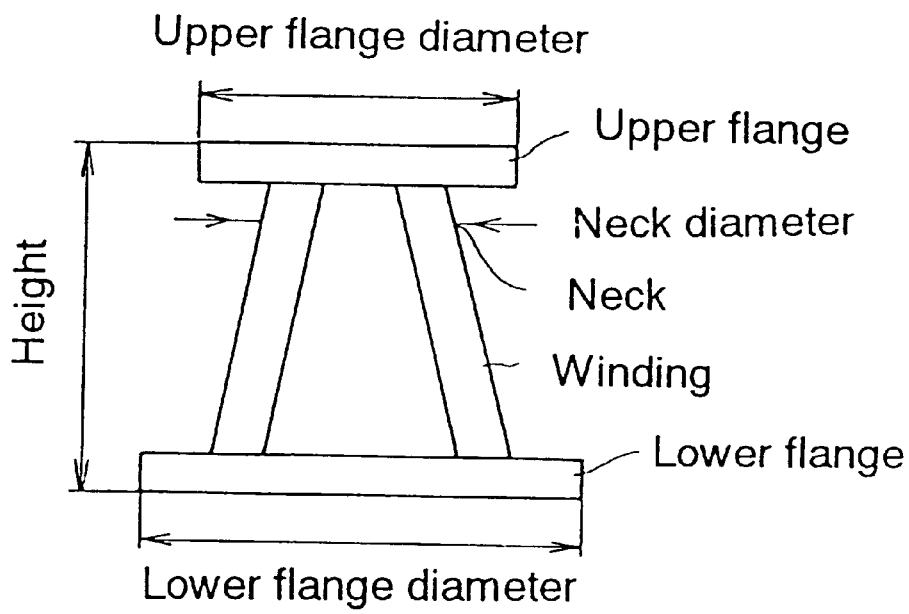
FIG. 2 is a schematic front elevational view of the coil which is used for indicating its dimensions including its neck diameter.
Figure 3:
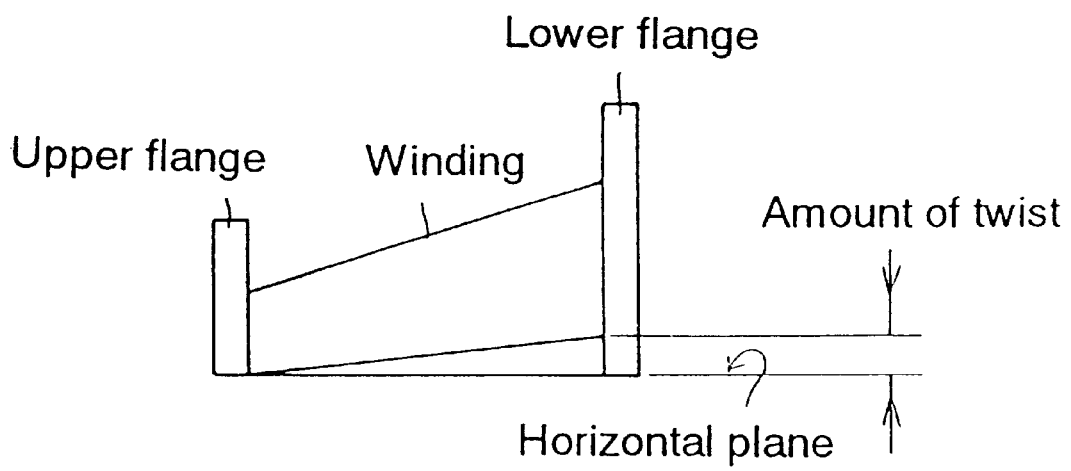
FIG. 3 is a schematic view of the coil which is used for explaining a method of determining its distortion.
Figure 4:
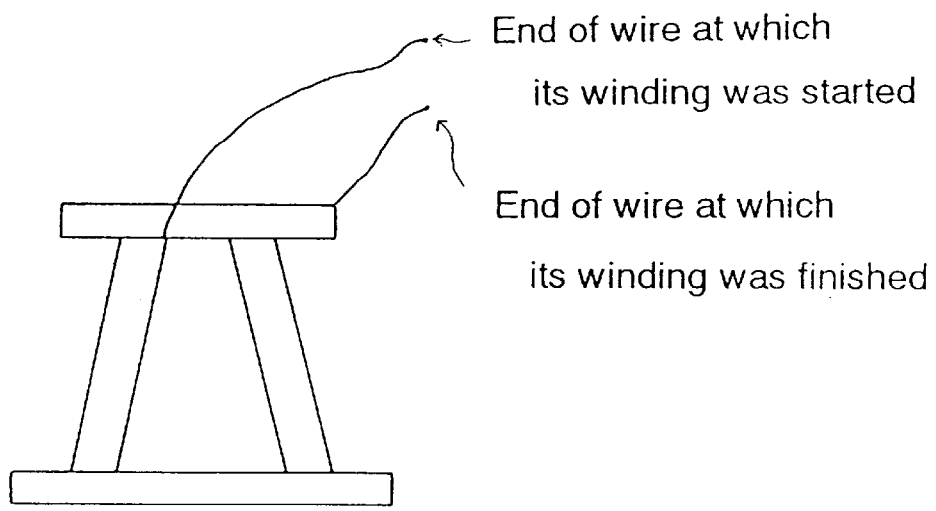
FIGS. 4(a) and 4(b) are schematic views of the coil which are used for explaining a method of measuring the bonding strength bearing on its end at which its winding was started.
Figure 4:
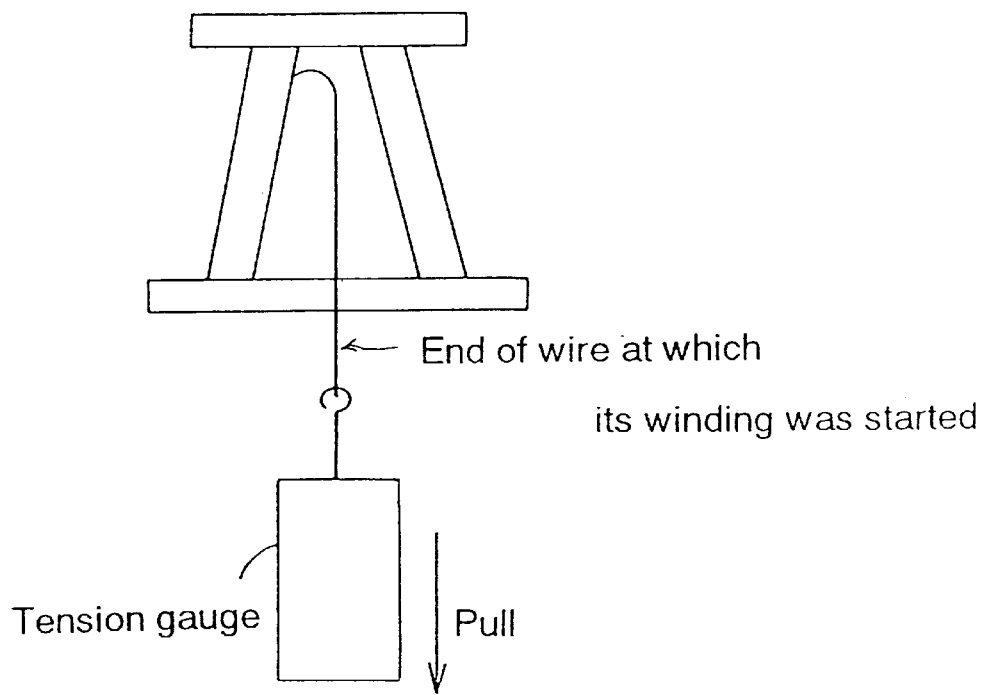

Each of the wires made as described in Examples 1 to 5 and Comparative Examples 1 to 5 was used to form a coil shaped as shown in FIGS. 1 and 2, and having an upper flange diameter of 51 mm, a lower flange diameter of 122 mm, a height of 70 mm and a neck diameter of 40.5 to 41.0 mm. Three winding bobbins were installed in a winding machine. A deflection coil was made by winding each wire having a diameter of 0.25 mm by 220 turns, melting its bonding layer and press molding it in the winding machine set for operation with three seconds of application of an electric current at a voltage of 190 V, 15 seconds of pressing for cooling, and a die temperature of 40° C. The coil removed from the die was left to stand at room temperature for 24 hours, and its neck diameter, the amount of its distortion and the bonding strength of the wire at its end at which its winding had been started were determined in the ways as shown in FIGS. 2 to 4(b). Then, the coil was left to stand in an oven having a constant temperature of 120° C. for 24 hours, and after its removal to room temperature, it was checked for any change in its neck diameter. The results are shown in Table 1.

TABLE 1

| Item | Example 1 | Example 2 | Example 3 | Example 4 | Example 5 | Comp. Ex. 1 | Comp. Ex. 2 | Comp. Ex. 3 | Comp. Ex. 4 | Comp. Ex. 5 |
|---|---|---|---|---|---|---|---|---|---|---|
| Bonding resin | | | | | | | | | | |
| Copolyamide resin Daicel-Hüls Ltd. X7079 | 100 Parts | 100 Parts | 100 Parts | 100 Parts | 100 Parts | 100 Parts | 100 Parts | | 100 Parts | 100 Parts |
| Epoxy resin Union Carbide PKHH | | | | | | | | 100 parts | | |
| High-melting resin | | | | | | | | | | |
| Nylon 66 (260° C.) Unitica A-100 | 5 Parts | 2 Parts | 9 Parts | | | | 15 Parts | | | |
| Nylon 46 (290° C.) Unitica F5000 | | | | 5 Parts | | | | | | |
| Nylon 6 (210° C.) Unitica 1030JR | | | | | 5 Parts | | | | | |
| Nylon 12 (180° C.) Daicel-Hüls Ltd. L1500 | | | | | | | | | 5 Parts | 20 Parts |
| Diameter of neck of coil as formed (mm) | 40.5 | 40.6 | 40.5 | 40.5 | 40.6 | 41 | 40.5 | 40.5 | 40.8 | 40.6 |
| Distortion of coil as formed (mm) | 0.2 | 0.3 | 0.2 | 0.2 | 0.3 | 0.9 | 0.1 | 0.2 | 0.5 | 0.2 |
| Bonding strength of wire in coil as formed (gf) | 350 | 380 | 250 | 300 | 300 | 380 | 220 | 0 | 300 | 0 |
| Amount of loosening of coil as formed (Amount/30) N = 30 | 0/30 | 0/30 | 1/30 | 0/30 | 0/30 | 0/30 | 10/30 | 30/30 | 0/30 | 30/30 |
| Change in neck diameter after exposure to heat (120° C.) (mm) | 0 | 0 | 0 | 0 | +0.05 | +0.05 | 0 | +0.6 | +0.05 | +0.05 |

(Note 1)
The value in [ ] is the melting point of the resin as represented by the peak revealed by DSC.
(Note 2)
Target levels - Optimum diameter of neck of coil as formed: 40.5 to 40.6 mm   Distortion of coil as formed: Within 0.3 mm   Bonding strength of wire in coil as formed: At least 250 gf (otherwise the coil is easily loosened)
(Note 3)
Dimensions of winding die - Neck diameter: 40.5 mm, Distortion: 0 mm As is obvious from Table 1, the coil of the wire according to Comparative Example 1 not containing any high-melting nylon resin in its bonding layer had a larger neck diameter as formed than that of the die, and a large amount of distortion, though the wire had a high bonding strength and the coil did not show any substantial deformation by heat. The coil of the wire according to Comparative Example 2 containing 15 parts of high-melting nylon resin in the bonding varnish was found loosened due to the low bonding strength of the wire, though it showed a satisfactorily small amount of deformation and distortion as formed, and also a satisfactorily small amount of heat deformation. The coil of the wire according to Comparative Example 3 as made by using an epoxy varnish as the bonding varnish was found loosened due to the lack of the wire in bonding strength, and also showed a large amount of heat deformation, though it showed a satisfactorily small amount of deformation and distortion as formed. The coil of the wire according to Comparative Example 4 as made by using a high-melting nylon resin having a melting point lower than 200° C. showed some improvements in its neck diameter and distortion as formed, but they still failed to reach the target levels. The coil of the wire according to Comparative Example 5 was found loosened due to the lack of the wire in bonding strength despite the use of a larger amount of high-melting nylon resin having a melting point lower than 200° C. On the other hand, the coils formed from the self-bonding insulated wires according to Examples 1 to 5 of this invention were free from any appreciable loosening due to defective bonding, and were close in dimensions to the winding die after having been left to stand at room temperature, and also showed a high resistance to heat deformation at an elevated temperature of 120° C.

EXAMPLE 6

A bonding varnish having a resin content of 18% was prepared by dissolving a polyamide resin A having a molar ratio of terminal carboxyl:amino groups of 20:80, a relative viscosity of 1.7 as determined in a 0.5% m-cresol solution thereof at 25° C. and a melting point of 110° C. as determined by DSC (Daiamid 470-1 of Daicel-Hüls Ltd.) in a mixed solvent consisting of cresol and xylene in a weight ratio of 70:30. The varnish was applied onto an insulated polyesterimide wire having a conductor diameter of 0.250 mm and a final outside diameter of 0.290 mm, and baked in an enameling oven having a length of 3 m and a temperature of 300° C., while the wire was fed therethrough at a speed of 36 m/min. Its application and baking were repeated three times to form a bonding layer having a thickness of 0.010 mm on the wire, and thereby make a self-bonding insulated wire embodying this invention.

The molar ratio of the terminal carboxyl and amino groups in the polyamide resin was calculated from their concentrations which had been determined as described below.

The concentration of the terminal amino groups was determined by dipping 0.1 to 0.5 g of a sample in 50 ml of a mixed solvent consisting of phenol and methanol in a volume ratio of 10:1, leaving it to stand for 12 hours, stirring it for several hours to dissolve it at room temperature, and subjecting the sample solution to automatic titration for reacting it with a 0.01N methanol solution of HCl to determine the concentration of the NH$_2$ groups in the sample solution. The concentration of the terminal carboxyl groups was determined by preparing a sample solution in the same way as described above, and subjecting it to automatic titration for reacting it with a 0.01N methanol solution of NaOH.

EXAMPLE 7

A self-bonding insulated wire embodying this invention was made by employing an enameling oven temperature of 330° C. and otherwise repeating Example 6.

EXAMPLE 8

A self-bonding insulated wire embodying this invention was made by employing an enameling oven temperature of 360° C. and otherwise repeating Example 6.

EXAMPLE 9

A self-bonding insulated wire embodying this invention was made by employing a polyamide resin B having a molar ratio of terminal carboxyl:amino groups of 20:80, a relative viscosity of 1.7 as determined in a 0.5% m-cresol solution thereof at 25° C. and a melting point of 125° C. as determined by DSC (M-1422-1 of NIHON RILSAN K.K.) and otherwise repeating Example 6.

EXAMPLE 10

A self-bonding insulated wire embodying this invention was made by employing the polyamide resin B as described above and otherwise repeating Example 7.

EXAMPLE 11

A self-bonding insulated wire embodying this invention a [] was made by employing the polyamide resin B as described above and otherwise repeating Example 8.

COMPARATIVE EXAMPLE 6

A self-bonding insulated wire representing the prior art was made by employing a polyamide resin C having a molar ratio of terminal carboxyl:amino groups of 80:20, a relative viscosity of 1.7 as determined in a 0.5% m-cresol solution thereof at 25° C. and a melting point of 110° C. as determined by DSC (Daiamid 470-2 of Daicel-Hüs Ltd.) and otherwise repeating Example 6.

COMPARATIVE EXAMPLE 7

A self-bonding insulated wire representing the prior art was made by employing the polyamide resin C as described above and otherwise repeating Example 7.

COMPARATIVE EXAMPLE 8

A self-bonding insulated wire representing the prior art was made by employing the polyamide resin C as described above and otherwise repeating Example 8.

COMPARATIVE EXAMPLE 9

A self-bonding insulated wire representing the prior art was made by employing a polyamide resin D having a molar ratio of terminal carboxyl:amino groups of 80:20, a relative viscosity of 1.7 as determined in a 0.5% m-cresol solution thereof at 25° C. and a melting point of 125° C. as determined by DSC (M-1442-2 of NIHON RILSAN K.K.) and otherwise repeating an Example 9.

COMPARATIVE EXAMPLE 10

A self-bonding insulated wire representing the prior art was made by employing the polyamide resin D as described above and otherwise repeating Example 10.

COMPARATIVE EXAMPLE 11

A self-bonding insulated wire representing the prior art was made by employing the polyamide resin D as described above and otherwise repeating Example 11.

COMPARATIVE EXAMPLE 12

A self-bonding insulated wire representing the prior art was made by employing a polyamide resin E having a molar ratio of terminal carboxyl:amino groups of 20:80, a relative viscosity of 1.3 as determined in a 0.5% m-cresol solution thereof at 25° C. and a melting point of 110° C. as determined by DSC (Daiamid 431 of Daicel-Hüls Ltd.) and otherwise repeating Example 6.

Each of the wires made as described in Examples 6 to 11 and Comparative Examples 6 to 12 was used to form a coil shaped as shown in FIGS. 1 and 2, and having an upper flange diameter of 51 mm, a lower flange diameter of 122 mm, a height of 70 mm and a neck diameter of 40.5 to 41.0 mm. Three winding bobbins were installed in a winding machine. A deflection coil was made by winding each wire having a diameter of 0.25 mm by 220 turns, melting its bonding layer and press molding it in the winding machine set for operation with three seconds of application of an electric current at a voltage of 190 V, 15 seconds of pressing for cooling, and a die temperature of 40° C. The coil removed from the die was left to stand at room temperature for 24 hours, and its neck diameter, the amount of its distortion and the bonding strength of the wire at its end at which its winding had been started were determined in the ways as shown in FIGS. 2 to 4(b). Then, each coil was left to stand in an oven having a constant temperature of 110° C., 120° C. or 130° C. for 24 hours, and after its removal to room temperature, it was checked for any change in its neck diameter. The results are shown in Table 2.

TABLE 2

|  | Example | | | | | | Comparative Example | | | | | | |
| --- | --- | --- | --- | --- | --- | --- | --- | --- | --- | --- | --- | --- | --- |
|  | 6 | 7 | 8 | 9 | 10 | 11 | 6 | 7 | 8 | 9 | 10 | 11 | 12 |
| Polyamide resin | A | A | A | B | B | B | C | C | C | D | D | D | E |
| Ratio of terminal carboxyl/amino groups | 20/80 | 20/80 | 20/80 | 20/80 | 20/80 | 20/80 | 80/20 | 80/20 | 80/20 | 80/20 | 80/20 | 80/20 | 20/80 |
| Relative viscosity | 1.7 | 1.7 | 1.7 | 1.7 | 1.7 | 1.7 | 1.7 | 1.7 | 1.7 | 1.7 | 1.7 | 1.7 | 1.3 |
| Melting point | 110 | 110 | 110 | 125 | 125 | 125 | 110 | 110 | 110 | 125 | 125 | 125 | 110 |
| Enameling oven temp. | 300 | 330 | 360 | 300 | 330 | 360 | 300 | 330 | 360 | 300 | 330 | 360 | 300 |
| Conductor diameter | 0.250 | 0.250 | 0.250 | 0.250 | 0.250 | 0.250 | 0.250 | 0.250 | 0.250 | 0.250 | 0.250 | 0.250 | 0.250 |
| Thickness of bonding layer | 0.010 | 0.010 | 0.010 | 0.010 | 0.010 | 0.010 | 0.010 | 0.010 | 0.010 | 0.010 | 0.010 | 0.010 | 0.010 |
| Neck diameter | 40.9 | 40.9 | 41.0 | 40.9 | 41.0 | 41.0 | 40.9 | 41.0 | 41.5 | 41.0 | 41.0 | 41.3 | 41.8 |

TABLE 2-continued

|  | Example | | | | | | Comparative Example | | | | | | |
| --- | --- | --- | --- | --- | --- | --- | --- | --- | --- | --- | --- | --- | --- |
|  | 6 | 7 | 8 | 9 | 10 | 11 | 6 | 7 | 8 | 9 | 10 | 11 | 12 |
| Resistance to heat deformation | | | | | | | | | | | | | |
| 110° C. | 0.10 | 0.08 | 0.07 | 0.07 | 0.06 | 0.04 | 0.11 | 0.30 | 1.30 | 0.07 | 0.06 | 0.23 | 0.20 |
| 120° C. | 0.30 | 0.38 | 0.37 | 0.10 | 0.08 | 0.07 | 0.30 | 1.15 | 2.15 | 0.10 | 0.14 | 0.59 | 0.32 |
| 130° C. | 1.10 | 1.06 | 1.13 | 0.10 | 0.06 | 0.15 | 1.54 | 3.29 | 4.29 | 0.18 | 0.44 | 2.39 | 1.28 |

As is obvious from Table 2, the coils of the wires according to Comparative Examples 6 to 8 and 9 to 11 each having a bonding layer formed from a polyamide resin varnish containing a lower molar ratio of terminal amino groups showed a worse degree of heat deformation with a rise in enameling oven temperature. A large increase in neck diameter was found in the coil of the wire according to Comparative Example 12 as made by employing a polyamide resin varnish having a low relative viscosity. On the other hand, the coils of the wires according to Examples 6 to 11 each having a bonding layer formed from a polyamide resin varnish having a higher molar ratio of terminal amino groups and an adequate relative viscosity did not show any substantial change in neck diameter, nor did they show any appreciable change in their good resistance to heat deformation irrespective of the enameling oven temperature varied in the range of 300° C. to 360° C.

EXAMPLE 12

A self-bonding insulated wire embodying this invention was made by employing 100 parts of polyamide resin B and 5 parts of A-100 of Unitica, nylon 66 having a melting point of 260° C., as a high-melting nylon resin to prepare a bonding varnish and otherwise repeating Example 9.

EXAMPLE 13

A self-bonding insulated wire embodying this invention was made by employing an enameling oven temperature of 330° C. and otherwise repeating Example 12.

EXAMPLE 14

A self-bonding insulated wire embodying this invention was made by employing an enameling oven temperature of 360° C. and otherwise repeating Example 12.

EXAMPLE 15

A self-bonding insulated wire embodying this invention was made by employing 100 parts of polyamide resin D and 5 parts of A-100 of Unitica, nylon 66 having a melting point of 260° C., as a high-melting nylon resin to prepare a bonding varnish and otherwise repeating Comparative Example 9.

EXAMPLE 16

A self-bonding insulated wire embodying this invention was made by-employing an enameling oven temperature of 330° C. and otherwise repeating Example 15.

EXAMPLE 17

A self-bonding insulated wire embodying this invention was made by employing an enameling oven temperature of 360° C. and otherwise repeating Example 15.

Each of the wires made as described in Examples 12 to 17 was used to form a coil shaped as shown in FIGS. 1 and 2, and having an upper flange diameter of 51 mm, a lower flange diameter of 122 mm, a height of 70 mm and a neck diameter of 40.5 to 41.0 mm. Three winding bobbins were installed in a winding machine. A deflection coil was made by winding each wire having a diameter of 0.25 mm by 220 turns, melting its bonding layer and press molding it in the winding machine set for operation with three seconds of application of an electric current at a voltage of 190 V, 15 seconds of pressing for cooling, and a die temperature of 40° C. The coil removed from the die was left to stand at room temperature for 24 hours, and its neck diameter, the amount of its distortion and the bonding strength of the wire at its end at which its winding had been started were determined in the ways as shown in FIGS. 2 to 4(b). Then, each coil was left to stand in an oven having a constant temperature of 110° C., 120° C. or 130° C. for 24 hours, and after its removal to room temperature, it was checked for any change in its neck diameter. The results are shown in Table 3.

TABLE 3

|  | Example | | | | | |
| --- | --- | --- | --- | --- | --- | --- |
|  | 12 | 13 | 14 | 15 | 16 | 17 |
| Polyamide resin | B | B | B | D | D | D |
| Ratio of terminal carboxyl/amino groups | 20/80 | 20/80 | 20/80 | 80/20 | 80/20 | 80/20 |
| Relative viscosity | 1.7 | 1.7 | 1.7 | 1.7 | 1.7 | 1.7 |
| Amount of high-melting nylon (parts) | 5 | 5 | 5 | 5 | 5 | 5 |
| Melting point (° C.) | 125 | 125 | 125 | 125 | 125 | 125 |
| Enameling oven temp. (° C.) | 300 | 330 | 360 | 300 | 330 | 360 |
| Conductor diameter (mm) | 0.250 | 0.250 | 0.250 | 0.250 | 0.250 | 0.250 |
| Thickness of bonding layer (mm) | 0.010 | 0.010 | 0.010 | 0.010 | 0.010 | 0.010 |
| Neck diameter (mm) | 40.5 | 40.5 | 40.6 | 40.5 | 40.7 | 40.9 |
| Resistance to heat deformation | | | | | | |
| 110° C. | 0.04 | 0.04 | 0.05 | 0.05 | 0.05 | 0.20 |
| 120° C. | 0.06 | 0.05 | 0.06 | 0.05 | 0.10 | 0.46 |
| 130° C. | 0.08 | 0.05 | 0.09 | 0.15 | 0.36 | 2.28 |

As is obvious from Table 3, the coils of the wires each having a bonding layer formed from the varnish prepared by adding a high-melting nylon resin to a polyamide resin having a higher molar ratio of terminal amino groups and an appropriate relative viscosity (Examples 12 to 14) showed a still smaller change in neck diameter and a still better resistance to heat deformation than the coils of the wires having their bonding layers formed from varnishs not containing any high-melting nylon resin. The polyamide resin employed in Examples 15 to 17 had a lower molar ratio of terminal amino groups, but the addition of a high-melting nylon resin made it possible to form a satisfactory bonding layer on each of the wires according to Examples 15 to 17. The coils of those wires showed a smaller change in neck diameter and a better resistance to heat deformation than the coils of wires having their bonding layers formed from varnishs not containing any high-melting nylon resin.

What is claimed is:

1. A self-bonding insulated wire having a bonding outermost layer formed from a resin composition comprising 100 parts by weight of a copolyamide resin having a melting point of 105° C. to 150° C., or a mixture of two or more such resins, and at least two, but less than 10 parts by weight of a high-melting nylon resin having a melting point of within the range of 210° C. to 300° C.

2. A self-bonding insulated wire as set forth in claim 1, wherein said high-melting nylon resin is a nylon resin having a melting point higher than at least 230° C.

3. A self-bonding insulated wire as set forth in claim 1, wherein said high-melting nylon resin is nylon 66.

4. A self-bonding insulated wire as set forth in claim 1, wherein said high-melting nylon resin is nylon 46.

* * * * *